April 28, 1970 NOBUTOSHI KIHARA 3,509,274

APPARATUS FOR THE RECORDING OF VIDEO SIGNALS AND FOR THE NORMAL, SLOW MOTION OR STILL PICTURE REPRODUCTION OF SUCH SIGNALS

Filed Sept. 23, 1966 3 Sheets-Sheet 1

INVENTOR.
NOBUTOSHI KIHARA
BY
Ward, Haselton, McElhannon, Orme, Brooks, & Fitzpatrick
ATTORNEYS APPARATUS FOR THE RECORDING OF VIDEO SIGNALS AND FOR THE NORMAL, SLOW MOTION OR STILL PICTURE REPRODUCTION OF SUCH SIGNALS Filed Sept. 23, 1966 3 Sheets-Sheet 2

INVENTOR.
NOBUTOSHI KIHARA

BY

Ward, Haselton, McElhannon, Orme, Brooks & Fitzpatrick
ATTORNEYS

April 28, 1970 NOBUTOSHI KIHARA 3,509,274

APPARATUS FOR THE RECORDING OF VIDEO SIGNALS AND FOR THE NORMAL, SLOW MOTION OR STILL PICTURE REPRODUCTION OF SUCH SIGNALS

Filed Sept. 23, 1966 3 Sheets-Sheet 3

INVENTOR.
NOBUTOSHI KIHARA

BY

Ward, Haselton, McElhannon, Orme, Brooks & Fitzpatrick
ATTORNEYS 3,509,274

APPARATUS FOR THE RECORDING OF VIDEO SIGNALS AND FOR THE NORMAL SLOW MOTION OR STILL PICTURE REPRODUCTION OF SUCH SIGNALS

Nobutoshi Kihara, Tokyo, Japan, assignor to Sony Corporation, Tokyo, Japan, a corporation of Japan Continuation-in-part of application Ser. No. 540,986, Apr. 7, 1966. This application Sept. 23, 1966, Ser. No. 581,519
Claims priority, application Japan, Sept. 27, 1965, 40/59,263
Int. Cl. H04n 5/78; G11b 5/56, 5/82
U.S. Cl. 178—6.6 18 Claims

ABSTRACT OF THE DISCLOSURE

In a recording and reproducing apparatus for video signals, the successive field signals are recorded in a spiral recording track on a recording disk and, for normally reproducing such signals, the pick-up head is made to exactly scan the spiral track, whereas, for slow-motion reproduction, the pick-up head is made to trace a spiral track differing in pitch from the recording track and the signals reproduced by the pick-up head, when the track traced thereby coincides with the recording track, are isolated and reproduced repetitively. Similarly, for still picture reproduction, the pick-up head is radially located to intermittently scan the portion of the spiral recording track corresponding to the desired field of the recorded video signals, and the signals from the head are repetitively and continuously reproduced.

This is a continuation-in-part of application Ser. No. 540,986, filed Apr. 7, 1966, now abandoned.

This invention relates to the recording and reproducing of electrical signals, and more particularly it concerns a novel recording and reproducing system for processing video signals.

The present invention is particularly suitable for use in connection with the magnetic recording and reproducing of television video signals. Such systems, known as video tape recorders, or VTR's have now been put into practical use. Conventional types of VTR's are too large in size, complicated in structure and expensive for many applications such as the recording of video signals over a relatively short period of time and for reproducing slow-motion and still-picture video signals other than normal video signals.

In view of the foregoing, the present invention is directed to the provision of a novel recording and reproducing apparatus which is simple in structure.

In one embodiment, the present invention comprises a magnetic video recorder which employs as a magnetic recording medium a rotary magnetic sheet for recording video signals thereon and reproducing the signals therefrom. This recorder is of simplified construction; yet it is capable of reproduction in slow motion and even isolated still pictures in addition to regular reproduction.

Other features and advantages of this invention will become apparent from the following description taken in conjunction with the accompanying drawings, in which.

Figures 1, 2, 4:
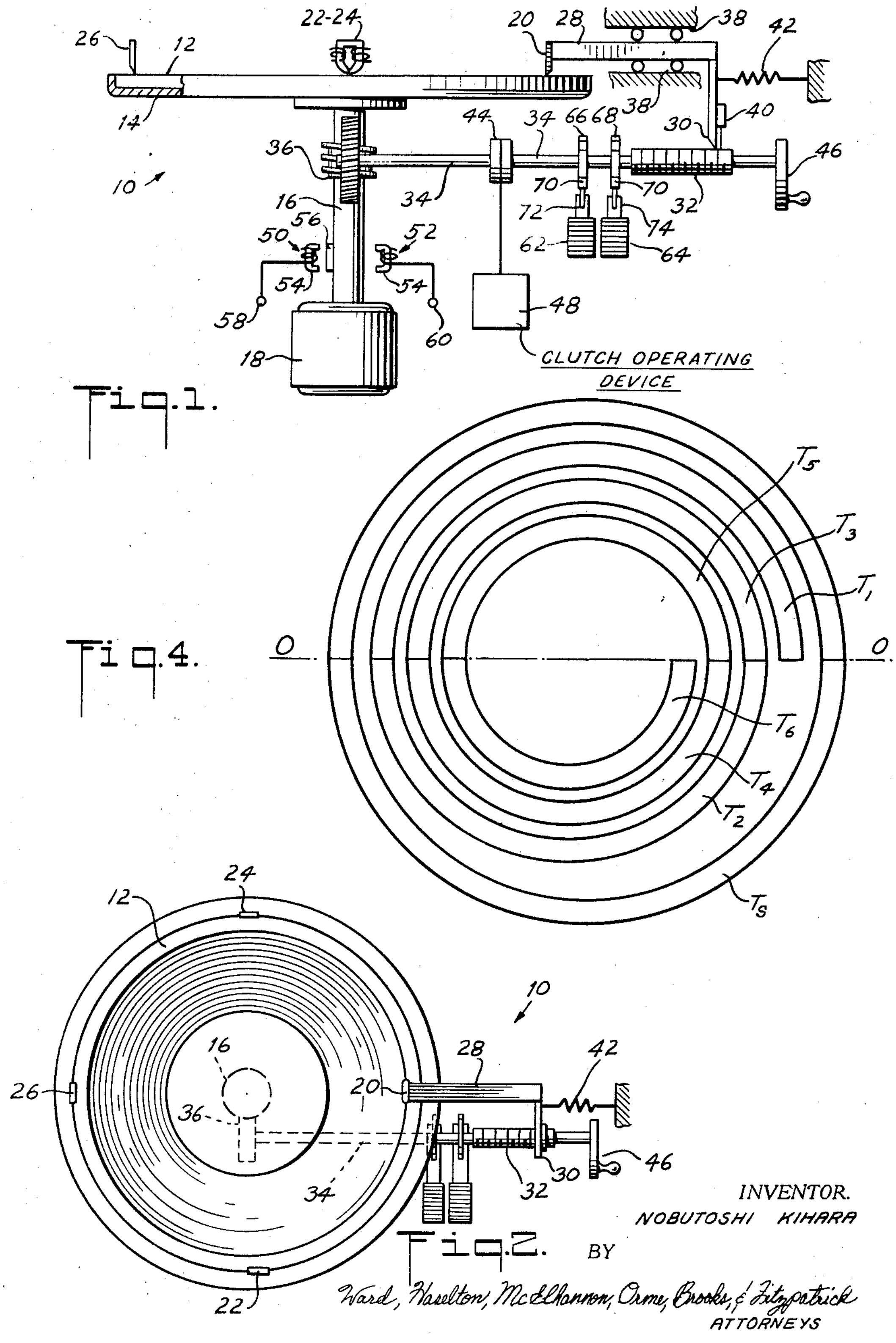
FIG. 1 is a schematic diagram illustrating one example of a rotary magnetic sheet device for use with a magnetic recording and reproducing system according to this invention.
FIG. 2 is a front view of the rotary magnetic sheet device shown in FIG. 1.
FIG. 4 is a front view of the rotary magnetic sheet schematically illustrating magnetic tracks formed thereon.

With reference to FIGS. 1 and 2, the following description will be given in connection with a rotary magnetic sheet device and the arrangement of magnetic heads for use therewith. As shown, there is provided a rotary magnetic sheet type recording system depicted generally at 10. This device comprises a thin disk-like magnetic sheet 12 supported in a taut condition on a rotary support 14. The support 14 in turn is coupled to a drive shaft 16 which is driven by a motor 18. The motor 18 is adapted to be driven at, for example, thirty revolutions per second in synchronism with the synchronizing impulses of a video signal, as will be described hereinafter.

Disposed in contact with the magnetic sheet 12 of the rotary magnetic sheet recording system 10 are a movable recording and reproducing magnetic head 20, a pair of stationary recording magnetic heads 22 and 24, and a stationary reproducing magnetic head 26. The movable recording and reproducing magnetic head 20 is mounted on a feed rod 28. The feed rod 28 in turn is coupled through a releasable screw engagement device 30 to a threaded portion 32 of a rotary coupling rod 34. The rotary coupling rod 34 is engaged through a gear arrangement 36 to be turned by the drive shaft 16. Thus as the motor 18 turns the magnetic sheet 12, the coupling rod 34 rotates; and, when the screw engagement device 30 is engaged, the feed rod 28 and the movable magnetic head are moved along the sheet 12 in an inward radial direction, thereby to trace along a spiral path, on the sheet, the pitch of the spiral being determined by the relative speeds of the drive shaft 16 and the coupling rod 34 and by the pitch of the threaded portion 32 of the rod 34. The feed rod 28 is guided by means of a guide device 38 for true radial movement over the magnetic sheet 12.

The screw engagement device 30 is arranged to be disengaged from the threaded portion 32 by means of a plunger or solenoid 40. When so disengaged, the feed rod 28 is then retracted in a radially outward direction by means of a bias spring 42 so as to bring the movable recording and reproducing head 20 back to a position near the periphery of the sheet 12.

Clutch means 44 are provided along the coupling rod 34 between the threaded portion 32 and the drive shaft 16. There is additionally shown external means, such as a manually operable handle 46 for turning the threaded portion 32 when the clutch means 44 are disengaged thereby to change or even stop the radial movement of the movable magnetic head 20 during rotation of the magnetic sheet 12. Such movement of the head 20 is thus made independent of the drive shaft 16. A suitable clutch operating device 48 is provided to operate the clutch means 44.

The stationary recording magnetic heads 22 and 24 are disposed in fixed positions adjacent the outside of the magnetic recording and reproducing region of the magnetic sheet 12 which is traversed by the movable magnetic head 20. The stationary heads 22 and 24 are disposed at equal distances from the center of rotation of the sheet 12 so as to trace over a common circular path as the sheet is rotated. Also, as shown, they are set apart at an angle of approximately 180° from each other. Additionally the stationary reproducing magnetic head 26 is disposed in like manner at the same radial distance along the sheet 12 as the heads 22 and 24.

With the above described arrangement, when a video signal is applied to the movable magnetic recording and reproducing head 20, while the screw engagement device 30 and the clutch means 44 are both engaged, the incoming video signal is continuously recorded on the magnetic sheet 12 while forming a spiral recording track thereon. Further, as will be seen when the video signals of one field period are applied to the stationary recording magnetic heads 22 and 24, they will become recorded on the magnetic sheet 12 along an annular magnetic track thereon. This recording is thereafter reproduced by the stationary reproducing magnetic head 26.

Surrounding the drive shaft 16, there are provided a pair of pulse generators 50 and 52. Each of these pulse generators comprises a separate magnetic head 54 disposed about the drive shaft 16 at approximately 180° apart. A common magnetic bar 56 is mounted on the shaft 16. As the bar 56 passes each head 54, it causes an output pulse to be produced at a corresponding pulse terminal 58 and 60. Thus each pulse generator 50 and 52 produces one output pulse for each revolution of the drive shaft 16.

Timing pulse generators 62 and 64 are provided in association with the coupling rod 34 between the clutch means 44 and the threaded portion 32. These timing pulse generators 62 and 64 are designed in the following manner. Thus for example, for the case where the coupling rod 34 and its threaded portion 32 is adapted to rotate once for every eight revolutions of the drive shaft 16, there are provided two rotary plates 66 and 68, each having eight cams 70 at equiangularly spaced apart distances and mounted on the shaft 16 in alternate spaced relation to each other. These cams operate corresponding switches 72 and 74 which are disposed at mutually the same angular positions opposite the rotary plates 66 and 68. With this arrangement, the switches 72 and 74 each produce one pulse for every revolution of the drive shaft 16 at a phase relationship corresponding to one half of the pulse period, when the clutch means 44 is engaged.

Figure 3:
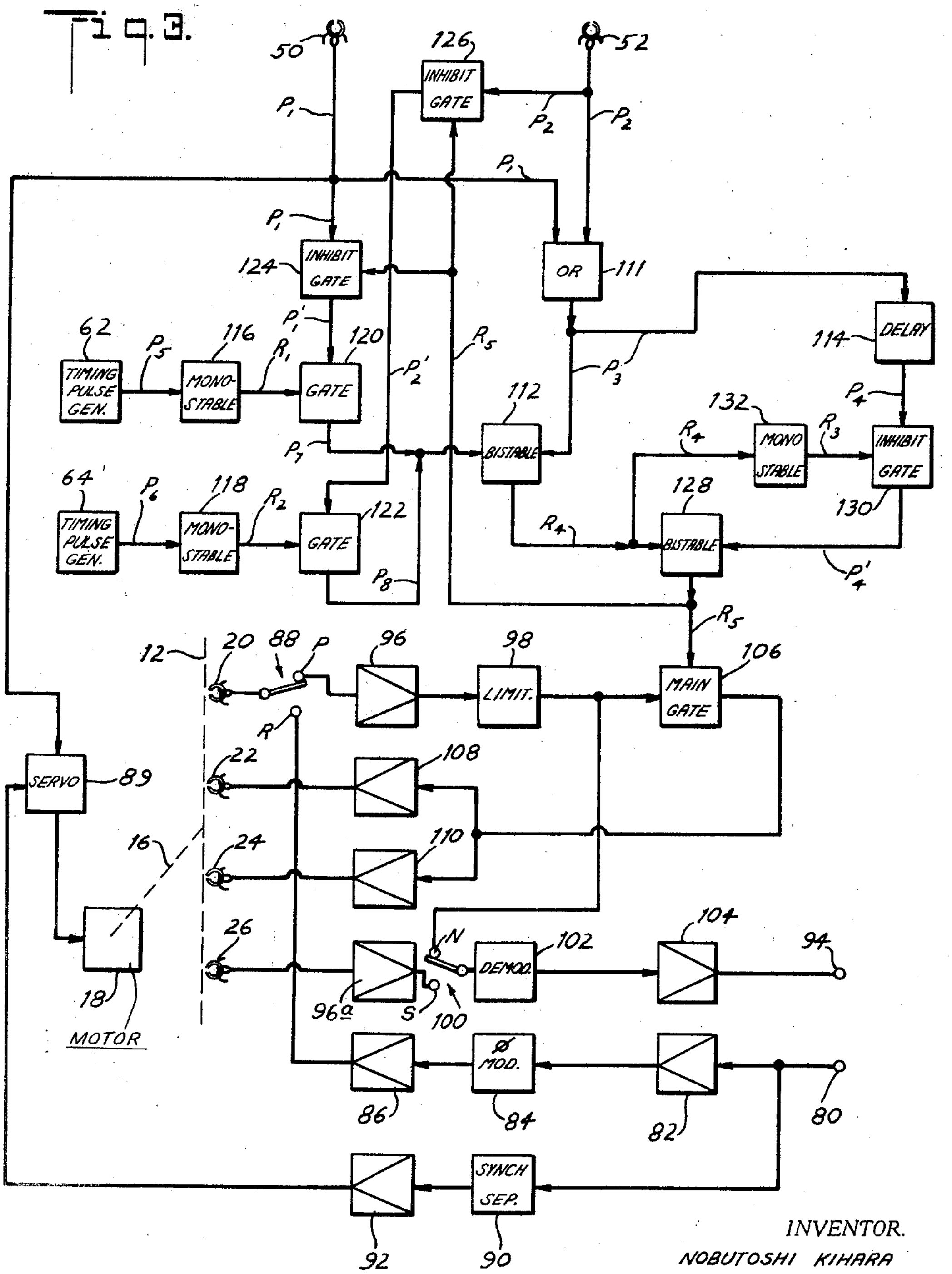
FIG. 3 is a block diagram illustrating one example of the magnetic recording and reproducing system according to this invention.

FIG. 3 shows in basic block diagram form a circuit arrangement for use in connection with the above described structure by which it operates to record and reproduce signals on the magnetic sheet 12.

In the arrangement of FIG. 3, video input signals are applied to a signal input terminal 80. These signals are interspersed with horizontal and vertical synchronizing pulses which separate the signals into lines and fields respectively. The fields, which represent the information presented during a complete scan of a picture tube, are thus sequentially fed to the movable recording and reproducing magnetic head 20 through an amplifier 82, a frequency or phase modulator 84, a recording amplifier 86 and a recording contact R of a recording and reproducing change-over switch 88. During this time the drive motor 18 is synchronously controlled by the output of a servo system 89 to which are applied pulses from the above described pulse generator 50 as well as the vertical synchronizing pulses obtained from the incoming video signals V. As shown these vertical pulses are obtained through a synchronizing signal separator circuit 90 and an amplifier 92. As a result of this, the odd numbered fields, will be recorded on the magnetic sheet 12 for each alternate half cycle of revolution thereof, starting for example, as shown in FIG. 4, from the reference angular position along the line O—O crossing the sheet 12 centrally thereof; and the even number fields will record on the sheet 12 for the intermediate half cycle of revolution thereof. Thus there is formed the generally spiral magnetic track on the magnetic sheet 12 as shown in FIG. 4. In the drawing the magnetic tracks each corresponding to each video signal fields are sequentially identified by reference numerals $T_1$, $T_2$, $T_3$, . . . . The pitch of the movement of the movable recording and reproducing magnetic head 20 on the magnetic sheet 12 is selected such that the semicircular magnetic tracks do not overlap at any revolution of the magnetic sheet 12.

For reproducing the video signals recorded on the magnetic sheet 12 as above described, the plunger or solenoid 40 is energized to disengage the screw engagement device 30 from the threaded portion 32 and the feed rod 28 is returned with the movable head 20 to its initial position by the bias spring 42. The screw engagement device 30 is then re-engaged with the threaded portion 32 and reproduction is initiated. The video signals reproduced by the movable magnetic head 20 are applied to an output terminal 94 through the reproducing contact P of the change-over switch 88. These signals pass from the switch 88 through a reproducing amplifier 96, a limiter 98, a normal contact N of a normal, stop, or slow-motion change-over switch 100, a demodulator 102 and an amplifier 104, producing an output video signal corresponding exactly to the original video signal V.

Slow motion signals are produced as follows: Firstly, the clutch means 4 is disconnected. Then the handle 46 is turned while the motor 18 drives the magnetic sheet 12. The reproduced signal from the movable magnetic head 20 is fed through the reproducing contact P of the change-over switch 88, the amplifier 96, the limiter 98 and a main gate circuit 106 to dual recording amplifiers 108 and 110, the outputs of which are applied respectively to the stationary recording magnetic heads 22 and 24. The gate circuit 106 is controlled to be opened by a gate signal produced by the hereinafter described circuits.

Figure 5:
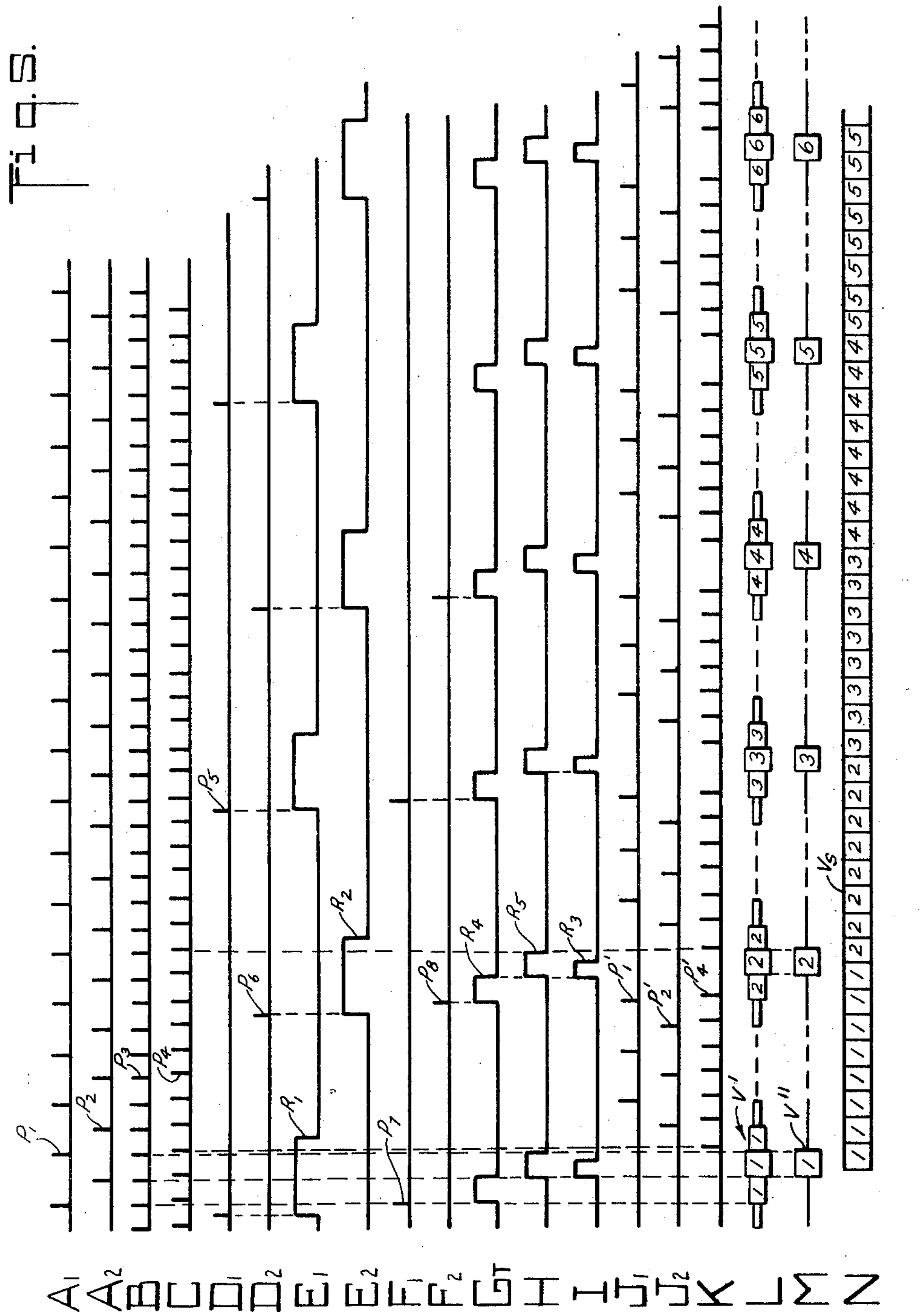
FIG. 5 illustrates signal arrangements for producing slow-motion video signals and still-picture video signals.

When the system is in operation, the motor 18 drives the sheet 12 at a rotational speed of 30 revolutions per second. Thus the pulse generators 50 and 52 each produce a series of pulses $P_1$ and $P_2$ at a 30 cps. repetition rate with the pulses in each series being $1/60$ sec. out of phase with each other. These pulse relationships are shown in FIGS. 5A, and $5A_2$. The pulses $P_1$ and $P_2$ are supplied through an OR circuit 111 to produce pulses $P_3$ (FIG. 5B) at a 60 cps. rate. The pulses $P_3$ are applied to the reset side of a first bistable multivibrator circuit 112 and to a delay circuit 114 so as to produce a slight delay. The delay circuit 114 produces a pulse $P_4$ slightly delayed behind the pulse $P_3$, as depicted in FIG. 5C.

Meanwhile, the rotation of the handle 46 (FIG. 1) causes the timing pulse generators 62 and 64 to produce timing pulses $P_5$ and $P_6$ such as shown in FIGS. $5D_1$ and $5D_2$.

The timing pulses $P_5$ and $P_6$ are applied to separate monostable multivibrator circuits 116 and 118, respectively producing rectangular wave outputs $R_1$ and $R_2$ each having a pulse width that is greater than two times the field period and less than three times the field period, as shown in FIGS. $5E_1$ and $5E_2$. These pulses $R_1$ and $R_2$ are fed respectively to first and second gate circuits 120 and 122 so that the gate circuits are respectively held open for the on-state period of the rectangular waves $R_1$ and $R_2$. Meanwhile, the pulse $P_1$ from the pulse generator 50 is applied to the first gate circuit 120 through a first inhibit gate circuit 124; and a pulse $P_7$ obtained through the gate circuit 120 is fed to the set side of the bistable multivibrator circuit 112. Similarly, the pulse $P_2$ from the pulse generator 52 is applied through a second inhibit gate circuit 126 to the second gate circuit 122; and a pulse $P_8$ obtained through the gate circuit 122 is fed to the set side of the bistable multivibrator circuit 112. The bistable circuit 112 is suitably designed to be set to its on-state for emitting output $R_4$ whenever a pulse $P_7$ or $P_8$ is received at its set terminal, and to be reset for halting the output $R_4$ only when a pulse $P_3$ is received at its reset terminal without a pulse $P_7$ or $P_8$ being simultaneously received at the set terminal. The output $R_4$ of the bistable multivibrator circuit 112 is applied to the set side of a second bistable multivibrator circuit 128 which is triggered to produce the output $R_5$ by the fall of the output $R_4$. The pulse $P_4$ produced by the delay circuit 114 is applied to a third inhibit gate circuit 128 so as to halt the output $R_5$ and a pulse $P_4'$ produced thereby is fed to the reset side of the bistable multivibrator circuit 130. It will be seen that the first and second inhibit gate circuits 124 and 126 are adapted to remain closed as long as the output of the second bistable multivibrator circuit 128 exists, while the third inhibit gate circuit 130 is adapted to be closed by the rectangular wave form output $R_3$ of a third monostable multivibrator circuit 132 which is triggered by the fall of the output $R_4$ of the first bistable multivibrator 112. In this case, the rectangular wave form output $R_3$ will be held "on" for a period of time a little longer than that corresponding to the phase difference between the pulses $P_3$ and $P_4$. As a result of this, the pulses $P_7$ and $P_8$, such as shown in FIGS. $5F_1$ and $5F_2$, are produced by the first and second gate circuits 120 and 122, the rectangular wave outputs $R_4$ and $R_5$, such as shown in FIGS. 5G and 5H, are produced by the first and second bistable multivibrators 112 and 128 and the rectangular wave output $R_3$, such as shown in FIG. 5I, is produced by the third monostable multivibrator 132. Further, the pulses $P_1'$ and $P_2'$, such as shown in FIGS. $5J_1$ and $5J_2$, are produced by the first and second inhibit gate circuits 124 and 126, and a pulse $P_4'$, such as shown in FIG. 5K, is produced by the third inhibit gate circuit 130. Consequently, the main gate circuit 106 is opened by the rectangular wave output $R_5$ of the second bistable multivibrator circuit 128. Thus the reproduced output from the limiter 98 is fed through the main gate circuit 106 to the stationary recording magnetic heads 22 and 24 for a period of time during which the gate circuit 106 remains opened.

The video signal V′ produced by the movable recording and reproducing magnetic head 20 consists of first, first, . . ., second, second, . . ., third, third, . . ., fields, as illustrated in FIG. 5L. In the reproduction of a picture in slow-motion the pitch of movement of the movable magnetic head 20 is narrower than usual, so that each field contains components having relatively little tracking error and components having much tracking error. This is illustrated in FIG. 5L in such a manner that as the field content becomes better, its area becomes larger. Thus, if the rotary angular position of the threaded portion 32 of the rotary coupling rod 34 is selected such that the rectangular wave $R_5$ may be produced just when the movable recording and reproducing magnetic head 20 lies on the magnetic tracks $T_1$, $T_3$, $T_5$, . . . and $T_2$, $T_4$, $T_6$, . . . (FIG. 4) on the magnetic sheet 12 at such a location that its tracking error is minimum, an intermittent video signal V″ consisting of first, second, third . . . fields is obtained through the main gate circuit 106, as shown in FIG. 5M and the content of this intermittent video signal V″ is of good $S/N$ ratio.

The contents of the fields of the video signal V″ are applied to the stationary recording magnetic heads 22 and 24 with the result that the signal contents of successive adjacent fields are sequentially recorded on the magnetic sheet 12 while forming a circular magnetic track $T_S$ (FIG. 4). In this case, the duration of each field of the video signals V″ depends upon the delay pulse $P_4$ and hence each magnetic track exactly agrees with preceding and following tracks.

During slow motion reproduction, change-over switch 100 is engaged with its contact S so that the signal contents of successive fields recorded in circular magnetic track $T_S$ are reproduced by stationary reproducing head 26 and applied to output terminal 94 through an amplifier 96*a*, contact S of switch 100, demodulator 102 and amplifier 104, thus producing a slow-motion picture signal $V_S$ consisting of successive groups of first, first, . . ., second, second, . . ., third, third, . . . etc. fields, as shown in FIG. 5N.

The slow-motion picture signal can be produced in the manner described above, and it will be apparent that suitable selection of the rotating speed of the manually operable handle 46 provides a slow-motion picture of a desired speed.

By stopping the rotation of the manually operable rotating handle 46 while observing the reproduced picture of such a slow-motion picture signal, a still-picture signal of a desired content can be obtained. This is because when the handle 46 is stopped, the timing pulses are not produced and the same picture is reproduced continuously.

The foregoing description has been made in connection with one specific example of this invention, this specific example being presented as illustrative but not as limiting the invention specifically thereto. By changing the construction of the rotary plates 66 and 68 having mounted thereon the cams 70 in the timing pulse generators, the manner of control of the main gate circuit 106 can be changed to thereby obtain various video signal arrangements. That is, it is possible that when reproducing a recorded video signal consisting of first, second, third, . . . fields, some specified fields are sampled such as, for example, first, first, . . . fifth, fifth, . . . and the non-sampled fields are replaced by the sampled ones. Further, an intermittent video signal consisting of, for example, first, blank, third, blank, . . . fields, is supplied to the input terminal 80 and the video signal is recorded on the magnetic sheet, the signal will be reproduced therefrom as a normal video signal, still-picture of slow-motion picture.

It will be apparent that many modifications and variations may be effected without departing from the novel concepts of this invention.

What is claimed is:

1. In a signal reproducing system, a recording medium on which signals are recorded along a first given track, a pickup head for reproducing signals recorded on said medium, means arranged to cause said pickup head to scan over said recording medium along a second given track which generally follows said first given track in such a manner that some portions of said second track more closely coincide with associated portions of said first track than do other portions, means for isolating and recording the signals produced by said pickup head which occur during its passage over each of said some portions and means for continuously and repetitively playing back each so recorded signal until the occurence of the next subsequent so recorded signal.

2. A system as in claim 1 wherein said system is adapted to handle signals of the type which are divided sequentially into fields by means of interspersed field separating signals so that said first given track is divided into separate segments each containing the signals of a separate field, and wherein said second given track successively traverses the region of each said separate segment a number of times, said means for isolating and recording the signals comprising means for gating the output of said pickup head to record only those signals which result when said pickup head follows the traverse of said second track which most closely coincides with each separate segment of said first track.

3. A system as in claim 2 wherein said gating means comprises first means for producing first synchronizing signals upon movement of said pickup head along said second track beyond each said first track segment in one direction, second means for producing second synchronizing signals upon movement of said pickup head along said second track beyond each said first track segment in an orthogonal direction whereby the successive traverses of the region of each separate segment of said first track by said second track results in the production of a plurality of each of said first synchronizing signals for each second synchronizing signal, a gating circuit interposed in the output of said pickup head, said gating circuit being arranged to be opened and closed respectively by successive ones of said first synchronizing signals once following the occurrence of each said second synchronizing signal.

4. A system as in claim 3 wherein each of the successive traverses of said second given track includes the region of a plurality of said segments, like pluralities of separate means for producing said first and second synchronizing signals and means arranged to select the successive ones of said first synchronizing signals to open and close said gating circuit in accordance with the particular means producing said second synchronizing signals.

5. A system as in claim 4 wherein each of said successive traverses of said second given track includes the region of a plurality of said segments, and wherein said gating circuit includes means for selecting different successive ones of said first synchronizing signals to open and close said gating circuit in accordance with corresponding ones of said second synchronizing signals.

6. A system as in claim 1 wherein said recording medium comprises a disk having means for rotating same about a given axis while recordings are made thereon in the form of a first continuous spiral track and wherein said means arranged to cause said pickup head to scan comprises means for controlling the radial movements of said pickup head over said disk during rotation of the disk.

7. A system as in claim 6 wherein said last mentioned means is operative to cause said pickup head to follow a second continuous spiral track of different pitch than said first spiral track.

8. A system as in claim 7 wherein said means for isolating and recording the signals from said pickup head include means for recording said isolated signals along selected portions of said disk.

9. A system as in claim 8 wherein the signals recorded along said first spiral track are divided into separate fields occupying adjacent rotational sectors along said first spiral track.

10. A system as in claim 9 further including first means for producing first synchronizing signals coinciding with rotation of said disk over said rotational sectors, second means for producing second synchronizing signals coinciding with the radial movements of said pickup head over a radial distance equal to that occupied by a given field on said first spiral track and gating means interposed at the output of said pickup head, said gating means being arranged to be opened and closed by successive ones of said first synchronizing signals once following each occurrence of a second synchronizing signal.

11. A system as in claim 10 wherein said adjacent rotational sectors along said first spiral track each occupy 180° of sectorial rotation, wherein said first means comprises separate pulse signal generators displaced 180° around said disk each to produce a first synchronizing signal once for each rotation of said disk, wherein said second means comprises separate further signal generators arranged to produce said second synchronizing signals in alternate sequence and wherein said gating means includes signal selection means causing said gating means to be opened by the output of a different pulse signal generator according to the signal generator supplying the last second synchronizing signal, and to be closed by the next subsequent first synchronizing signal.

12. A system as in claim 11 wherein said signal selective means comprises first and second gate circuits arranged respectively in the output paths of said separate pulse signal generators, means connected to the output of each of said separate further signal generators for opening a different one of said gate circuits for predetermined durations, a main gate circuit controlling the output of said pickup head, a bistable switching means connected to control said main gate circuit, means connecting the outputs of both said first and second gate circuits to one input of said bistable switching means and additional means bypassing said first and second gate circuits connecting the outputs of both said separate pulse signal generators to the other input of said bistable switching means.

13. A system as in claim 12 wherein said additional means includes a signal delay circuit.

14. A system as in claim 13 wherein said additional means includes an inhibit gate circuit and means connected to operate said inhibit gate circuit for a predetermined length of time in response to outputs from said first and second gate circuits.

15. A system as in claim 14 wherein there is provided a inhibit gate circuit in the output path of each of said separate pulse generators between said additional means and the respective first and second gate circuits and means arranged to operate each said inhibit gate circuit in response to outputs from said bistable switching means.

16. A system as in claim 8 wherein there are provided at least one record head and a pickup head each stationarily mounted adjacent said disk at a common distance from its axis of rotation, said record head being connected to receive and record said isolated signals.

17. A system as in claim 16 wherein there are provided two such record heads sectorially spaced 180° from each other and both connected to receive and record said isolated signals simultaneously.

18. A recording system comprising a recording disk, means for moving a first head radially at a first speed while rotating said disk to record signals thereon along a first spiral track, means for moving a said first head radially along said disk at a second speed to produce signals therefrom, a second record head fixedly mounted adjacent said disk away from said first spiral track, means operative to select and isolate from the output of said first head those signals which it produces while more closely following each successive portion of said first spiral track, means for supplying said isolated signals to said second record head, and a third head fixedly mounted adjacent said disk at the same radial distance from its axis as said second record head to repetitively play back the isolated signals recorded on said disk.

References Cited

UNITED STATES PATENTS

| | | | |
|---|---|---|---|
| 2,955,157 | 10/1960 | Young | 178—6.6 |
| 3,229,035 | 1/1966 | Bounsall | 178—6.6 |
| 3,395,248 | 7/1968 | Suzuki et al. | 178—6.6 |

ROBERT L. GRIFFIN, Primary Examiner

R. K. ECKERT, JR., Assistant Examiner

U.S. Cl. X.R.

179—100.2